US012272852B2

(12) United States Patent
Li

(10) Patent No.: US 12,272,852 B2
(45) Date of Patent: Apr. 8, 2025

(54) DIELECTRIC FILTER

(71) Applicant: Telefonaktiebolaget LM Ericsson (publ), Stockholm (SE)

(72) Inventor: Jingpeng Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 132 days.

(21) Appl. No.: 18/037,666

(22) PCT Filed: Jul. 26, 2021

(86) PCT No.: PCT/CN2021/108432
§ 371 (c)(1),
(2) Date: May 18, 2023

(87) PCT Pub. No.: WO2022/110854
PCT Pub. Date: Jun. 2, 2022

(65) Prior Publication Data

US 2023/0411815 A1 Dec. 21, 2023

(30) Foreign Application Priority Data

Nov. 27, 2020 (CN) ......................... 202022806470.0

(51) Int. Cl.
*H01P 1/20* (2006.01)
*H01P 1/213* (2006.01)
*H01P 7/10* (2006.01)

(52) U.S. Cl.
CPC ............ *H01P 1/2002* (2013.01); *H01P 1/213* (2013.01); *H01P 7/105* (2013.01)

(58) Field of Classification Search
CPC .......... H01P 1/2002; H01P 1/20; H01P 1/201; H01P 1/208; H01P 1/2088; H01P 1/202;
(Continued)

(56) References Cited

U.S. PATENT DOCUMENTS 7,956,708 B2 7/2011 Bates et al.

FOREIGN PATENT DOCUMENTS

CN 110265753 A 9/2019
CN 110504512 A 11/2019
(Continued)

OTHER PUBLICATIONS

International Search Report and Written Opinion issued in International Application No. PCT/CN2021/108432 dated Jul. 26, 2021 (8 pages).

*Primary Examiner* — Stephen E. Jones
(74) *Attorney, Agent, or Firm* — Rothwell, Figg, Ernst & Manbeck, P.C.

(57) ABSTRACT

Disclosed is a dielectric filter. The dielectric filter includes a body, a first resonant unit, a second resonant unit and a groove. The first resonant unit is arranged at a first side of the body. The second resonant unit is arranged at a second side of the body opposite to the first side. The groove is formed at a middle position of the body and is configured to partially separate the first resonant unit and the second resonant unit from each other. Each of the first resonant unit and the second resonant unit includes a first frequency resonant hole, a second frequency resonant hole and a coupling adjustment hole. In each of the first resonant unit and the second resonant unit, the first frequency resonant hole and the second frequency resonant hole are located on different surfaces of the body, and the first frequency resonant hole has a first longitudinal extension line perpendicular to a second longitudinal extension line of the second frequency resonant hole, and the coupling adjustment hole is located on another surface of the body and has a third longitudinal extension line parallel to the first longitudinal extension line or the second longitudinal extension line.

10 Claims, 4 Drawing Sheets

(58) Field of Classification Search
CPC ...... H01P 1/205; H01P 1/2053; H01P 1/2056; H01P 3/16
See application file for complete search history.

(56) References Cited

FOREIGN PATENT DOCUMENTS

| | | | |
|---|---|---|---|
| CN | 110896163 | A | 3/2020 |
| CN | 111106419 | A | 5/2020 |
| CN | 111740193 | A | 10/2020 |
| CN | 111987394 | A | 11/2020 |
| CN | 211879571 | U | 11/2020 |
| EP | 0 855 757 | A2 | 7/1998 |
| EP | 2 062 366 | B1 | 8/2013 |
| EP | 3 742 543 | A1 | 11/2020 |
| KR | 10-2020-0086219 | A | 7/2020 |

DIELECTRIC FILTER

CROSS REFERENCE TO RELATED APPLICATIONS

This application is a 35 U.S.C. § 371 National Stage of International Patent Application No. PCT/CN2021/108432, filed Jul. 26, 2021, designating the United States and claiming priority to Chinese Application No. 202022806470.0, filed on Nov. 27, 2020. The above identified applications are incorporated by reference.

BACKGROUND

Field of the Present Disclosure

The present disclosure generally relates to the field of telecommunications technology, and in particular, to a dielectric filter.

Description of the Related Art

This section is intended to provide background or context for specific embodiments of the present disclosure described in claims. The description herein may include concepts which are intended to be claimed and may be concepts that have not been conceived, implemented or described previously. Therefore, the content described in this section should not be considered as the related art to the description and claims of the present disclosure although it is included in this section, unless otherwise stated.

Base station is an important part of a mobile communication system, and typically includes a BU (Baseband Unit), a RU (Radio Unit) and an antenna. In a typical base station, a RRU (Remote Radio unit) and an AU (Antenna Unit) are two independently separated units and are hung on high construction. Considering installation, fixation, occupation and other factors, it is desirable that the base station has smaller volume and lighter weight during designing the base station.

In recent years, with the development of the mobile communication system, demands for the radio unit of small size and high performance are growing rapidly. The current advance radio unit is required to be miniaturized in a whole unit size as much as possible, and a filter used with the radio unit is accordingly also required to have an increasingly small size.

Currently, a miniaturized filter includes a body made by a solid dielectric material and a plurality of resonators formed by metalizing, for example by plating silver, a surface of the body. Each of the resonators generates a resonant frequency at an operating pass band. The resonators and a coupling between the resonators form a waveguide filter.

SUMMARY

In view of the above, embodiments of the present disclosure is to provide a dielectric filter in order to overcome at least one aspect of the above-mentioned and other disadvantages and defects in the related art.

According to one aspect of the present disclosure, there is provided a dielectric filter including: a body; a first resonant unit arranged at a first side of the body; a second resonant unit arranged at a second side of the body opposite to the first side; and a groove formed at a middle position of the body and configured to partially separate the first resonant unit and the second resonant unit from each other, wherein each of the first resonant unit and the second resonant unit includes a first frequency resonant hole, a second frequency resonant hole and a coupling adjustment hole, and in each of the first resonant unit and the second resonant unit, the first frequency resonant hole and the second frequency resonant hole are located on different surfaces of the body, and the first frequency resonant hole has a first longitudinal extension line perpendicular to a second longitudinal extension line of the second frequency resonant hole, and the coupling adjustment hole is located on another surface of the body and has a third longitudinal extension line parallel to the first longitudinal extension line or the second longitudinal extension line.

In some embodiments of the present disclosure, in each of the first resonant unit and the second resonant unit, the coupling adjustment hole has a depth greater than that of any one of the first frequency resonant hole and the second frequency resonant hole.

In some embodiments of the present disclosure, the first frequency resonant hole of the first resonant unit and the first frequency resonant hole of the second resonant unit are located on two opposite surfaces of the body, respectively, and the second frequency resonant hole of the first resonant unit and the second frequency resonant hole of the second resonant unit are located on the same surface of the body.

In some embodiments of the present disclosure, the second frequency resonant hole of the first resonant unit and the second frequency resonant hole of the second resonant unit are located on two opposite surfaces of the body, respectively, and the first frequency resonant hole of the first resonant unit and the first frequency resonant hole of the second resonant unit are located on the same surface of the body.

In some embodiments of the present disclosure, the groove is configured as a through groove or a through hole extending at one side of the body between two opposite surfaces of the body. Alternatively, the groove is configured as a slot or an opening extending inwardly from one of two opposite surfaces of the body. Alternatively, the groove is configured as a slot or an opening extending from a middle portion between two opposite surfaces of the body without extending through the two opposite surfaces.

In some embodiments of the present disclosure, at least one of the first frequency resonant hole, the second frequency resonant hole and the coupling adjustment hole is a blind hole or a through hole.

In some embodiments of the present disclosure, the dielectric further includes a conductive layer configured to cover all surfaces of the body and at least partially cover each of the first frequency resonant hole, the second frequency resonant hole and the coupling adjustment hole.

In some embodiments of the present disclosure, at least one of the first frequency resonant hole, the second frequency resonant hole and the coupling adjustment hole is a through hole with a step, and at least a portion of the step is not coated with the conductive layer.

In some embodiments of the present disclosure, the body is made of a dielectric material.

In some embodiments of the present disclosure, at least one of the first frequency resonant hole, the second frequency resonant hole and the coupling adjustment hole has a cross section in a rectangular, circular, oval or polygonal shape.

BRIEF DESCRIPTION OF THE DRAWINGS

Accompanying drawings of embodiments of the present disclosure will be briefly described below in order to more clearly describe technical solutions of the embodiments of the present disclosure. It should be understood that the accompanying drawings described below only refer to some embodiments of the present disclosure, rather than limiting the present disclosure, in which.

DETAILED DESCRIPTION

In order to more clearly illustrate objectives, technical solutions, and advantages of the present disclosure, embodiments of the present disclosure will be described in detail below with reference to the accompanying drawings. It should be understood that the following description of the embodiments is intended to explain and illustrate general idea of the present disclosure, and should not be construed as a limitation to the present disclosure. In the description and the accompanying drawings, same or similar reference signs refer to same or similar elements or components. For sake of clarity, the drawings are not necessarily drawn to scale, and some well-known components and structures may be omitted from the drawings.

The technical or scientific terms used herein shall have common meanings understood by those ordinary skilled in the art, unless otherwise stated. The words "first", "second" and similar words used herein are merely intended to distinguish different elements or components, rather than indicating any order, quantity or importance. The word "a" or "an" does not exclude a plurality. The word "include", "comprise" or other similar words means that an element or item appearing before the word covers an element or item listed and their equivalents after the word, but does not exclude other elements or items. The word "connect", "connection" or other similar words are not limited to physical or mechanical connections, and may include direct or indirect electrical connection. The word "up", "down", "left", "right", "top" or "bottom" is merely used to indicate the relative position relationship. When an absolute position of a described object is changed, its relative position relationship may also be accordingly changed. When an element such as a layer, a film, a region, or a substrate is described as "on" or "under" another element, the element may be "directly" "on" or "under" the another element, or there may be an intermediate element.

Figure 1:
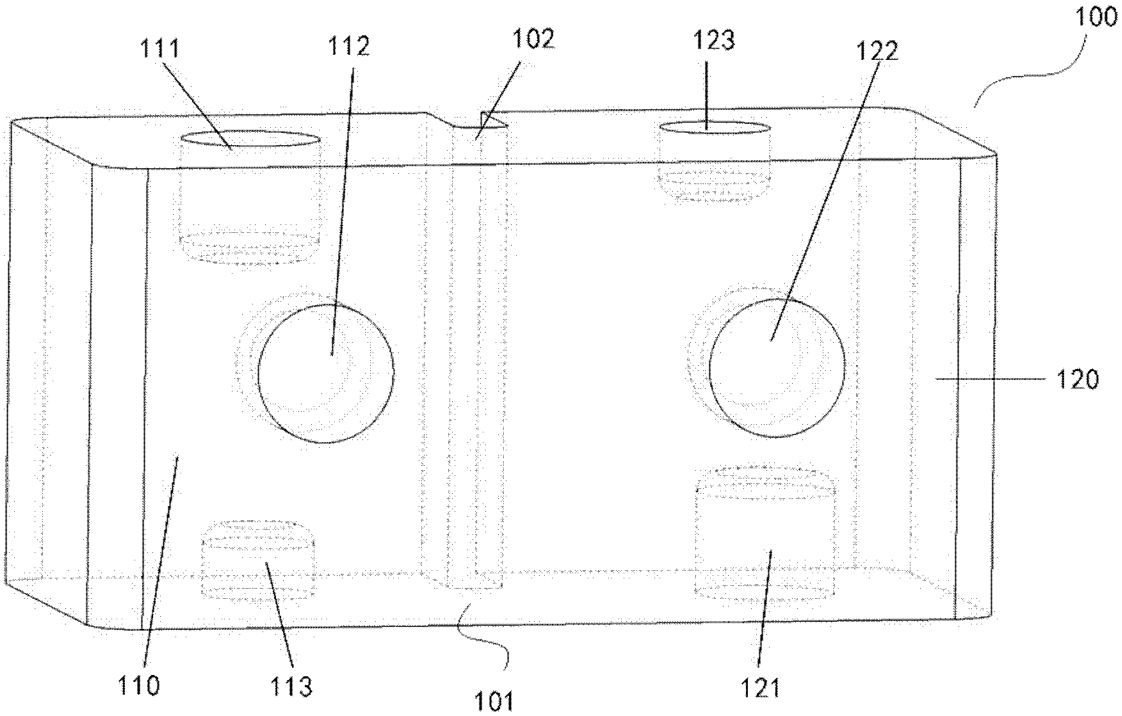
FIG. 1 shows a perspective view of a dielectric filter according to an embodiment of the present disclosure.

Referring to FIG. 1, a dielectric filter 100 according to the present disclosure is shown. Specifically, the dielectric filter 100 includes a body 101, a first resonant unit 110, a second resonant unit 120 and a groove 102. Of course, the dielectric filter 100 may also include other known components which are necessary to realize functions as desired, the detailed description of which will be omitted herein.

Figure 2:
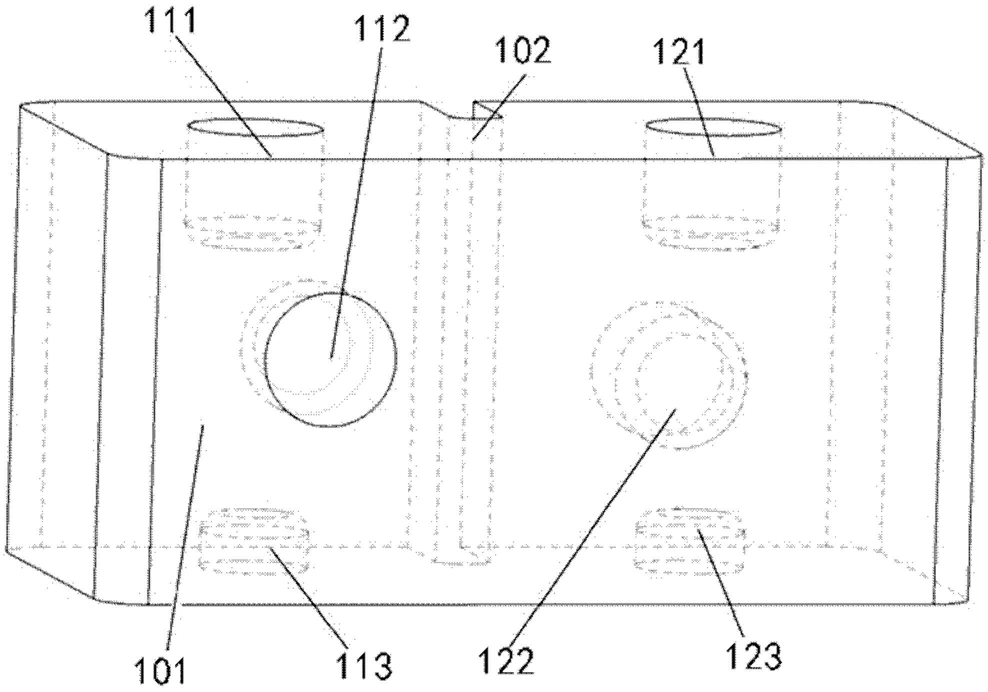
FIG. 2 shows a perspective view of a dielectric filter according to another embodiment of the present disclosure.

The body 101 may be made of a solid dielectric material that may be any possible dielectric material known in the art. The body 101 may have a cuboid or cube shape. Alternatively, the body 101 may also have other shapes. Note that FIGS. 1 and 2 shows that corners of the body are cut to prevent the body from being damaged.

The groove 102 is disposed at a middle position of the body. The following description will be made by taking the cuboid or cube shape as an example. The groove 102 is configured to partially divide the body 101. However, the groove 102 is configured not to completely divide the body 101 into two portions completely separated from each other. In other words, the two portions separated by the groove 102 are always connected to each other by a portion of the body 101 regardless of an arrangement form of the groove 102.

In the example shown in FIG. 1, the groove 102 is a through groove extending from an upper surface to a lower surface in a rear surface as shown. Alternatively, the groove 102 may also be a blind groove extending partially from the upper surface or the lower surface, or a slot extending in a middle portion without extending through the upper surface or the lower surface. In addition, the groove 102 may also be configured as a through hole extending from the upper surface or the lower surface.

Further, in addition to configuring the groove 102 to extend from the upper surface to the lower surface as shown in FIG. 1, the groove 102 may also be configured to extend from a front surface to the rear surface in a direction perpendicular to the page as shown in FIG. 1.

Figure 3:
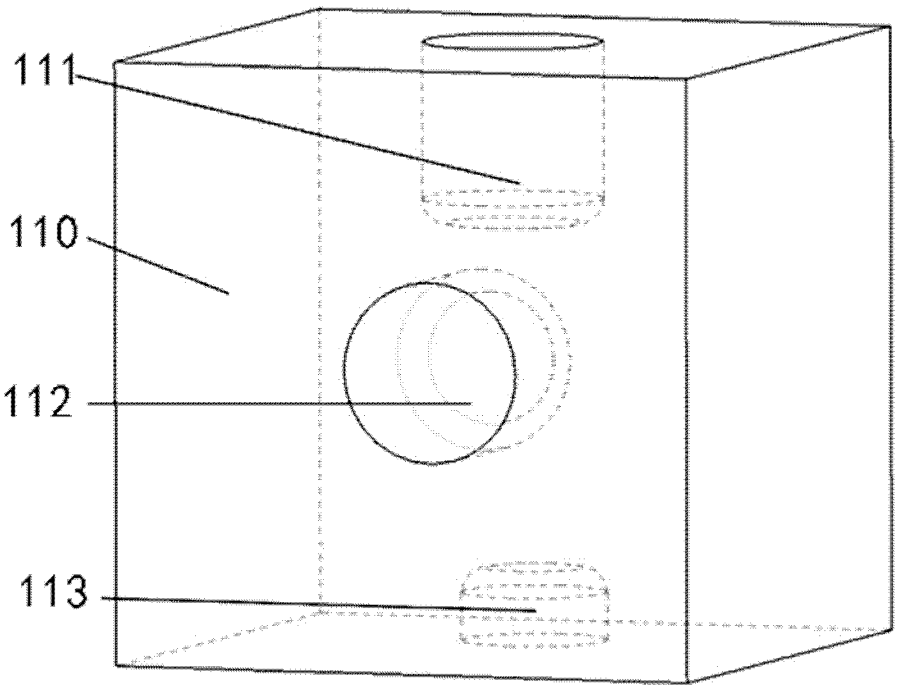
FIG. 3 shows a perspective view of a single resonant unit in the dielectric filter shown in FIG. 1 or FIG. 2.

As shown in FIG. 3, the first resonant unit 110 as shown in FIG. 1 is illustrated. The first resonant unit 110 includes a first frequency resonant hole 111, a second frequency resonant hole 112 and a coupling adjustment hole 113. In fact, the first resonant unit 110 and the second resonant unit 120 are substantially same as each other in structure, and the difference therebetween is only in position, size and shape of the first frequency resonant hole, the second frequency resonant hole and the coupling adjustment hole. A description will be made by taking the first resonant unit 110 as an example below.

The first frequency resonant hole 111 and the second frequency resonant hole 112 are located on two different surfaces of the body 101. Further, the first frequency resonant hole 111 has a first longitudinal extension line perpendicular to a second longitudinal extension line of the second frequency resonant hole 112. As shown in FIG. 1, the first frequency resonant hole 111 is formed on an upper surface of the body 101, and the first longitudinal extension line thus is a normal line of the upper surface of the body 101. Further, the second frequency resonant hole 112 is formed on a front surface of the body 101, and the second longitudinal extension line thus is a normal line of the front surface of the body 101.

The coupling adjustment hole 113 is located on another surface of the body 101 except for the surfaces on which the first frequency resonant hole 111 and the second frequency resonant hole 112 are formed. Further, the coupling adjustment hole 113 has a third longitudinal extension line parallel to the first longitudinal extension line or the second longitudinal extension line. Specifically, as shown, the coupling adjustment hole 113 may be formed on a lower surface of the body 101. In this case, the third longitudinal extension line is a normal line of the lower surface, and the third longitudinal extension line is obviously parallel to the first longitudinal extension line. Alternatively, the coupling adjustment hole 113 may also be formed on a rear surface of the body 101. In this case, the third longitudinal extension line is a normal line of the rear surface and is parallel to the second longitudinal extension line.

In the first resonant unit 110, each of the first frequency resonant hole 111 and the second frequency resonant hole 112 has a relatively long longitudinal extension length greater than a longitudinal extension length of the coupling adjustment hole 113. That is, each of the first frequency resonant hole 111 and the second frequency resonant hole 112 has a depth greater than that of the coupling adjustment hole 113.

It should be noted that the depths of the first frequency resonant hole 111 and the second frequency resonant hole 112 may be set as desired. For example, in a case where the body 101 has the cube shape, the depths of the first frequency resonant hole 111 and the second frequency resonant hole 112 may be set substantially same as each other. In addition, in a case where the body 101 has the cuboid shape, the depths of the first frequency resonant hole 111 and the second frequency resonant hole 112 may be set different from each other.

With continued reference to FIG. 1, the first resonant unit 110 is located at a left side of the body 101, the second resonant unit 120 is located at a right side of the body 101, and the first resonant unit 110 and the second resonant unit 120 are connected by a portion of the body 101. In the second resonant unit 120, the first frequency resonant hole 121 is formed on the lower surface of the body 101, the second frequency resonant hole 122 is formed on the front surface of the body 101, and the coupling adjustment hole 123 is formed on the upper surface of the body 101.

That is, the first frequency resonant hole 111 of the first resonant unit 110 and the first frequency resonant hole 121 of the second resonant unit 120 are formed on two opposite surfaces of the body 101, respectively, i.e., one of the first frequency resonant holes 111 and 121 is located on the upper surface, and the other is located on the lower surface. Further, the second frequency resonant hole 112 of the first resonant unit 110 and the second frequency resonant hole 122 of the second resonant unit 120 are formed on the same surface of the body 101, namely, both of the second frequency resonant holes 112 and 122 are located on the front surface of the body 101.

Referring to FIG. 2, a perspective view of a modified embodiment of the dielectric filter according to the present disclosure is shown. The second frequency resonant hole 112 of the first resonant unit 110 and the second frequency resonant hole 122 of the second resonant unit 120 are formed on two opposite surfaces of the body 101, respectively, i.e., one of the second frequency resonant holes 112 and 122 is located on the front surface, and the other is located on the rear surface. Further, the first frequency resonant hole 111 of the first resonant unit 110 and the first frequency resonant hole 121 of the second resonant unit 120 are formed on the same surface of the body 101, namely, both of the first frequency resonant holes 111 and 121 are located on the front surface of the body 101.

FIGS. 1 and 2 only show two embodiments of the present disclosure by way of illustration. Of course, those skilled in the art may also conceive other possible equivalent modifications based on the above-described embodiments of the present disclosure.

Figure 4A:
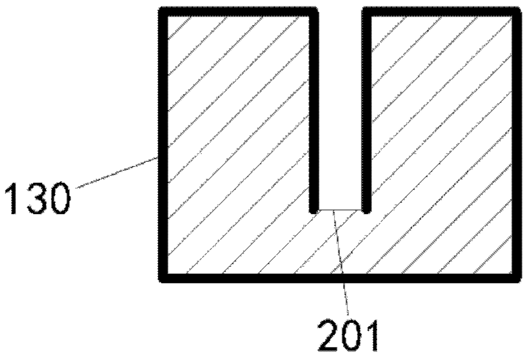
FIG. 4A shows a cross-sectional view of a frequency resonant hole shown in FIG. 3.

As shown in FIG. 4A, an example is shown in which any one of the first frequency resonant holes 111 and 121, the second frequency resonant holes 112 and 122, or the coupling adjustment holes 113 and 123 of the first resonant unit 110 or the second resonant unit 120 according to the present disclosure may be provided as the form of a blind hole 201. A depth, a size and a shape of the blind hole 201 may be set as desired. The blind hole 201 is configured such that a conductive layer 130 would not be coated over an entire inner surface of the blind hole. That is, at least part of the inner surface of the blind hole 201 is not covered with the conductive layer 130. The conductive layer 130 may be configured to cover all surfaces of the body 101.

Figure 4B:
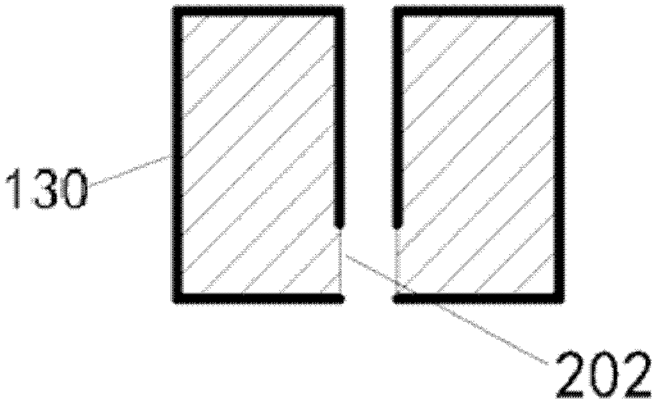
FIG. 4B shows a cross-sectional view of a modification of the frequency resonant hole shown in FIG. 3.
Figure 4C:
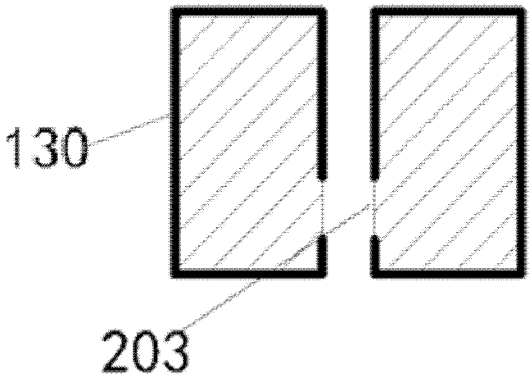
FIG. 4C shows a cross-sectional view of another modification of the frequency resonant hole shown in FIG. 3.

As shown in FIG. 4B, an example is shown in which any one of the first frequency resonant holes 111 and 121, the second frequency resonant holes 112 and 122, or the coupling adjustment holes 113 and 123 of the first resonant unit 110 or the second resonant unit 120 according to the present disclosure may be provided in the form of a through hole 202. A depth, a size and a shape of the through hole 202 may be set as desired. The through hole 202 is configured such that the conductive layer 130 would not be coated over an entire inner surface of the through hole. That is, at least part of the inner surface of the through hole 202 is not covered with the conductive layer 130. For example, a region which is not covered with the conductive layer 130 may be provided on a bottom region of the through hole 202. Or else, the region which is not covered with the conductive layer 130 may be provided on a middle region of the through hole 203, as shown in FIG. 4C. In addition, the conductive layer 130 may be configured to cover all surfaces of the body 101.

Figure 4D:
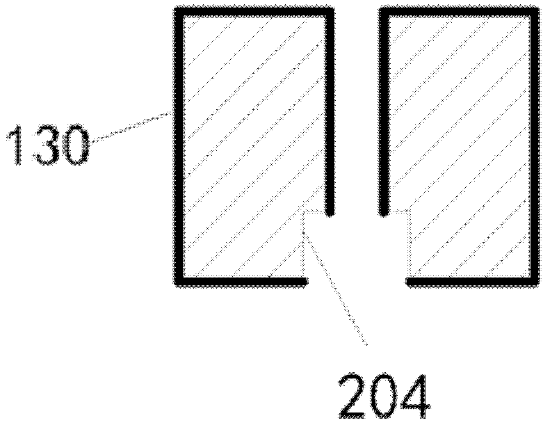
FIG. 4D shows a cross-sectional view of a further another modification of the frequency resonant hole shown in FIG. 3.

Alternatively, as shown in FIG. 4D, an example is shown in which any one of the first frequency resonant holes 111 and 121, the second frequency resonant holes 112 and 122, or the coupling adjustment holes 113 and 123 of the first resonant unit 110 or the second resonant unit 120 according to the present disclosure may be provided in the form of a stepped through hole 204. A depth, a size and a shape of the stepped through hole 204 may be set as desired. A stepped region of the stepped through hole 204 is configured not to be covered with the conductive layer 130. In addition, the conductive layer 130 may be configured to cover all surfaces of the body 101.

Figure 5:
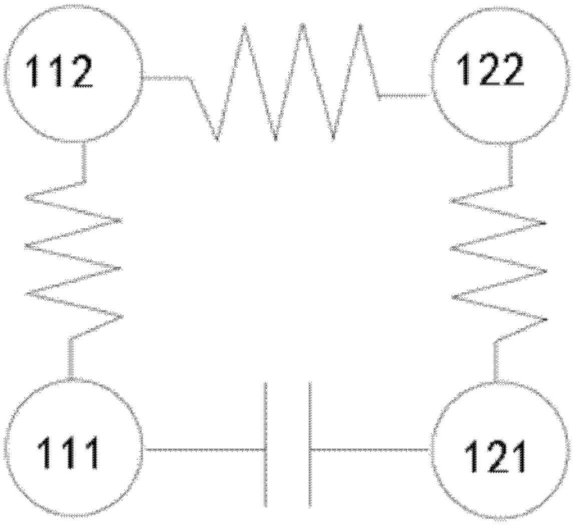
FIG. 5 shows a schematic topological view of the dielectric filter according to the present disclosure.

As shown in FIG. 5, a schematic topological view of the dielectric filter 100 according to the present disclosure is illustrated. In FIG. 5, a topological structure of resonant frequency and coupling of the two resonant units of the dielectric filter 100 is shown, which further illustrates that the dielectric filter 100 according to the present disclosure can realize inductive and capacitive couplings.

Figure 6:
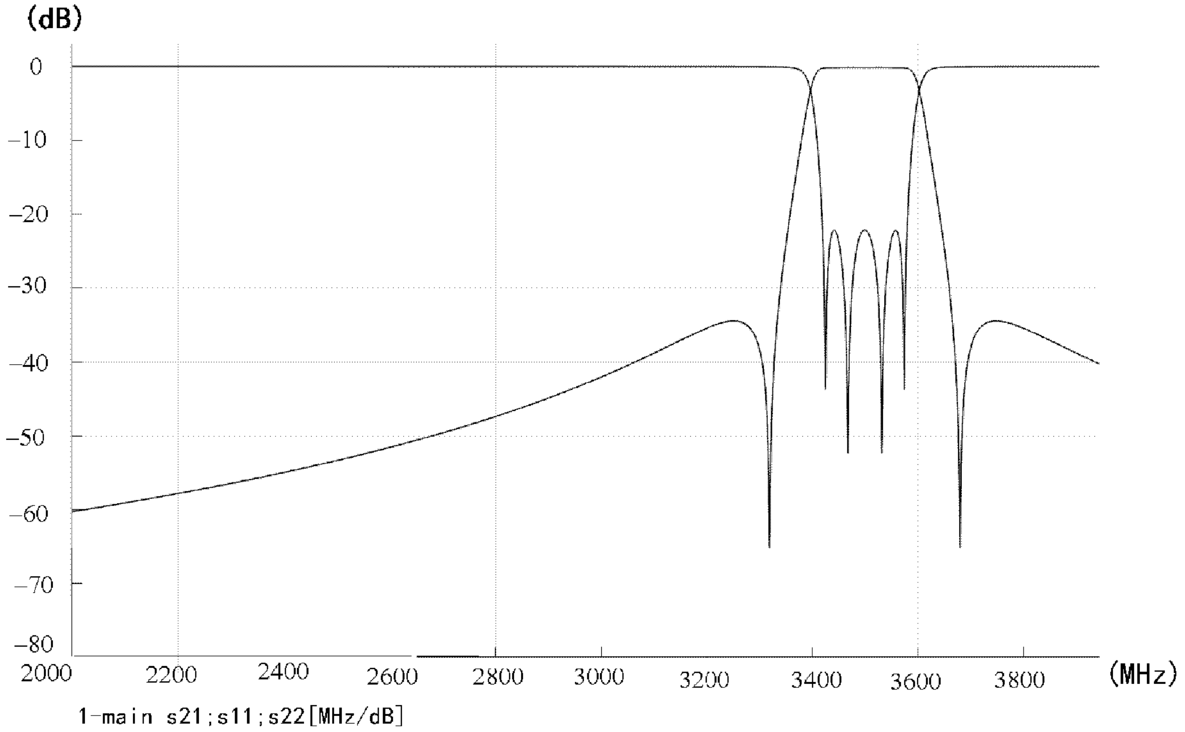
FIG. 6 shows an S parameter simulation view of the dielectric filter shown in FIG. 1 according to the present disclosure.

As shown in FIG. 6, an S parameter simulation result implemented by the dielectric filter 100 shown in FIG. 1 is illustrated. Specifically, two coupling transmission zeros are displayed at a high pass band and a low pass band, and no harmonic spikes appear in a low frequency band of the pass band.

In addition, it should be noted that in the illustrated examples of the present disclosure, a cross-section of each of the first frequency resonant hole, the second frequency resonant hole and the coupling adjustment hole is shown in a circular shape. Alternatively, the cross-section may also be provided as various shapes such as a rectangular, elliptical, or polygonal shape, and it is not necessary to set the cross sections of the first frequency resonant hole, the second frequency resonant hole and the coupling adjustment hole to be same with each other, and the shape of each of first frequency resonant hole, the second frequency resonant hole and the coupling adjustment hole may be set as desired.

The above-mentioned embodiments merely exemplarily illustrate the principle and structure of the present disclosure, rather than being intended to limit the present disclosure. It should be understood by those skilled in the art that any changes and modifications made to the present disclosure without departing from the general concept of the present disclosure shall fall within the scope of the present disclosure. The scope of the present disclosure shall be defined by the claims of the present disclosure.

What is claimed is:

1. A dielectric filter, comprising:

a body;

a first resonant unit arranged at a first side of the body;

a second resonant unit arranged at a second side of the body opposite to the first side; and a groove formed at a middle position of the body and configured to partially separate the first resonant unit and the second resonant unit from each other, wherein each of the first resonant unit and the second resonant unit comprises a first frequency resonant hole, a second frequency resonant hole and a coupling adjustment hole, in each of the first resonant unit and the second resonant unit, the first frequency resonant hole and the second frequency resonant hole are located on different surfaces of the body, the first frequency resonant hole has a first longitudinal extension line perpendicular to a second longitudinal extension line of the second frequency resonant hole, and the coupling adjustment hole is located on another surface of the body and has a third longitudinal extension line parallel to the first longitudinal extension line or the second longitudinal extension line.

2. The dielectric filter of claim 1, wherein, in each of the first resonant unit and the second resonant unit, the coupling adjustment hole has a depth greater than that of any one of the first frequency resonant hole and the second frequency resonant hole.

3. The dielectric filter of claim 1, wherein, the first frequency resonant hole of the first resonant unit and the first frequency resonant hole of the second resonant unit are located on two opposite surfaces of the body, respectively, and the second frequency resonant hole of the first resonant unit and the second frequency resonant hole of the second resonant unit are located on a same surface of the body.

4. The dielectric filter of claim 1, wherein, the second frequency resonant hole of the first resonant unit and the second frequency resonant hole of the second resonant unit are located on two opposite surfaces of the body, respectively, and the first frequency resonant hole of the first resonant unit and the first frequency resonant hole of the second resonant unit are located on a same surface of the body.

5. The dielectric filter of claim 1, wherein, the groove is configured as a through groove or a through hole extending at one side of the body between two opposite surfaces of the body, the groove is configured as a slot or an opening extending inwardly from one of two opposite surfaces of the body, or the groove is configured as a slot or an opening extending from a middle portion between two opposite surfaces of the body without extending through the two opposite surfaces.

6. The dielectric filter of claim 1, wherein the first frequency resonant hole, the second frequency resonant hole, and/or the coupling adjustment hole is a blind hole or a through hole.

7. The dielectric filter of claim 6, further comprising a conductive layer configured to cover all surfaces of the body and at least partially cover each of the first frequency resonant hole, the second frequency resonant hole and the coupling adjustment hole.

8. The dielectric filter of claim 7, wherein the first frequency resonant hole, the second frequency resonant hole, and/or the coupling adjustment hole is a through hole with a step, and at least a portion of the step is not coated with the conductive layer.

9. The dielectric filter of claim 1, wherein the body is made of a dielectric material.

10. The dielectric filter of claim 1, wherein the first frequency resonant hole, the second frequency resonant hole, and/or the coupling adjustment hole has a cross section in a rectangular, circular, oval or polygonal shape.

* * * * *